July 1, 1969   G. B. CONNAN   3,453,349
DENTURE BASE MATERIAL AND METHOD OF MOLDING DENTURE BASE
Filed April 21, 1966

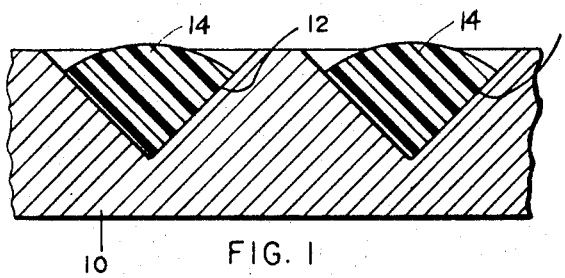
FIG. 1

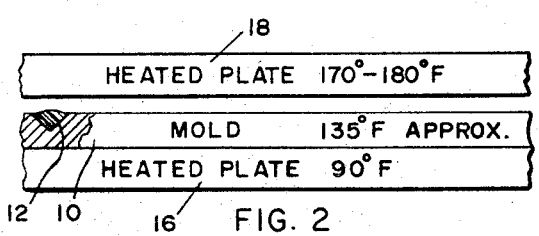
FIG. 2

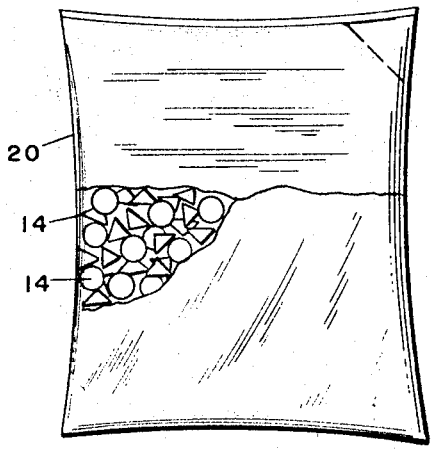
FIG. 3

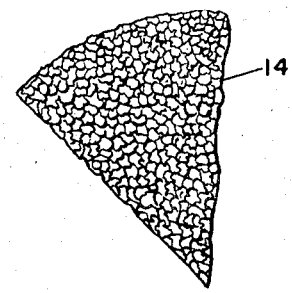
FIG. 4

LOAD PELLET MOLD WITH SLURRY OF POLYMERIC RESIN AND METHYL ALCOHOL AND TROWEL TOP OF MOLD.

HEAT LOADED MOLD TO EVAPORATE ALCOHOL AND DRY PELLETS IN POROUS RIGID CONDITION.

REMOVE DRIED PELLETS FROM MOLD AND COMPLETE DRYING IN AIR TO INSURE DESIRED DRYNESS.

TUMBLE MIXTURE OF VARIOUS COLORS OF PELLETS TO MIX THOROUGHLY AND THEN SIEVE TO REMOVE POWDER.

PACKAGE MEASURED QUANTITY OF PELLET MIXTURE IN FLEXIBLE CONTAINER.

ADD MONOMER TO PELLET MIXTURE IN CONTAINER AND KNEAD TO BLEND INTO MOTTLED VARI-COLORED DOUGH.

PACK DENTURE MOLD WITH DOUGH AND CURE UNDER HEAT AND PRESSURE TO FORM RIGID DENTURE.

FIG. 5

INVENTOR
GEORGE B. CONNAN
BY
ATTORNEY

United States Patent Office 3,453,349
Patented July 1, 1969

3,453,349
DENTURE BASE MATERIAL AND METHOD OF MOLDING DENTURE BASE
George Bruce Connan, Preston, Victoria, Australia, assignor to The Dentists' Supply Company of New York, York, Pa., a corporation of New York
Filed Apr. 21, 1966, Ser. No. 544,071
Int. Cl. A61c *13/00;* A61k *5/00*
U.S. Cl. 264—16      10 Claims

ABSTRACT OF THE DISCLOSURE

A method of forming porous small pellets of polymeric denture base material capable of being softened by the addition of monomeric material compatable therewith for limited kneading into a plstic dough, the pellets being colored various hues and shades normally possessed by natural gum tissues, whereby said resulting dough will be vari-colored and capable of being packed into a mold to form a denture which, when cured, will resemble the normal mottled and vari-colored pattern of natural gum tissues.

---

This invention relates to improvements in denture base material and is directed particularly to the provision of a denture base material adapted to simulate the variations in shading which occur in natural gum tissue.

Conventionally, dentures are formed by moulding the denture plate from pink colored moulding powders such as methyl methacrylate polymers, or copolymers of vinyl, styrene and like plastic material. These powders are wetted with a monomer in appropriate proportions and converted into a gel or dough. This plastic mass is then loaded into the dental flask and pressed and cured into the shape of the denture. Dentures so formed are usually uniform in color and therefore fail to simulate very closely the natural gum tissue which is essentialy mottled due to varying cornified and venous effects in the tissue. Mottled effects may be produced in the denture by using varying colored powders in selected areas but this is very time-consuming and requires a great skill on the part of the dental technician. Furthermore, due to the tendency for pigments to wash out when wetted with the monomer and because of unwanted flow of the pigmented material from the selected areas, the results are often only partly successful. A further means of simulating the appearance of natural gum tissue in artificial dentures is by the use of preformed color veneers which are applied to the gingival portions of the denture. Such veneers are, however, relatively expensive and they do not affect the appearance of the palate portion of the denture.

The object of this invention, therefore, is to provide a simply utilizable and stable form of denture base material which can be employed as desired to produce a denture in which the coloring is mottled or polychromatic in relatively broad areas in simulation of the areas of shading in natural gum tissue.

According to this invention, there is provided a polymeric denture base material in the form of dry porous pellets of varying shades which are capable of being converted to mouldable dough when required for use. The pellets of varying shades may be dispersed either at random or by design during use.

The pellets may be produced by wetting pre-pigmented powders of a polymeric denture base material with a solvent capable of partially dissolving the polymer powder and then applying heat to dry out the solvent, The resultant product is dry, porous and wafer-like with the pigment firmly bonded to the powder particles by the chemical etching of the polymer particles by the action of alcohol and warmth and may be made in the form of pellets either by the mould itself or by subsequent subdivision. Quantities of pellets so formed but having varying shades of pinkness and in some cases opaque pale yellowish and bluish tones, may be mixed more or less at random and a quantity of such pellets may be taken and formed into a dental plate.

If desired, colored fibers may also be incorporated in addition to the pigments.

Brief description of the drawing

FIG. 1 is a fragmentary, enlarged sectional view of a mold in which pellets are formed in accordance with the invention, several exemplary pellets being shown in the mold cavities.

FIG. 2 is a fragmentary side elevation of exemplary apparatus for drying the pellets.

FIG. 3 is an elevational view of an exemplary bag containing a quantity of variously colored pellets with which monomer may be mixed and kneaded to form a dough.

FIG. 4 is a fragmentary enlarged sectional view of an exemplary pellet to illustrate the porosity thereof.

FIG. 5 is an exemplary flow diagram to illustrate the preferred method of performing the invention.

In order that the invention may be better understood, a specific embodiment thereof will now be described by way of example, as illustrated generally in the flow diagram of FIG. 5.

Pre-pigmented methyl methocrylate powder is mixed to a slurry with approximately 98% strength methyl alcohol until a smooth readily pourable slurry is formed. This slurry is then poured into a mould.

The mould 10 in accordance with the present embodiment of the invention comprises an aluminum plate of dimensions 18″ by 18″ and provided over its surface with a mass of shallow blind drilled holes 12 of diameter approximately ¼″ and depth approximately ³⁄₁₆″ the holes are shaped to a slightly rounded but generally shallow conical form and in the present embodiment, 2700 such holes are formed in the above-mentioned plate.

The slurry is trowelled over the surface of the plate so that all of the holes are filled to form pellets 14. The slurry is then allowed to dry for a short time sufficient to allow surplus alcohol to evaporate. This condition can be seen when the surface of the slurry becomes dull. The mould is then placed in a heating press comprising a bottom plate 16 which is warmed to about 90° F. and a top heating platen 18 which is heated to approximately 170° to 180° F. The press is arranged so that there is a clearance of about ⅛″ between the top platen and the top of the mould whereby the heat applied to the mould is radiant heat so that the mould reaches a temperature of about 135° F. The mould is heated thus in the press for periods of from four to five and a half minutes, depending upon the color of the material within the mould pale colored material requiring longer time than dark colored materials due to their greater reflecting. Thus, I have found that a pale pink pigmented material requires heating for about 5¼ minutes while relatively dark pink or bluish materials require to be heated for only 4 minutes. It will also be appreciated that shorter heating periods will suffice at highear temperatures. Thus, if temperatures as high as say 180° F. are achieved in the mould, the heating time may be reduced to say one and a half minutes.

After heating in the press is completed, the mould 10 with the formed pellets 14 therein is removed and placed in an air dryer of suitable type, not shown, at a temperature of 110 to 120° F. for a period of 10 to 15 minutes. Thereafter, the dry porous wafer-like pellets 14 formed in the mould are removed from the mould and allowed to stand for a further 24 hours in the atmosphere to ensure complet drying. The porosity is illustrated fragmentarily, in enlarged manner, in FIG. 4. The resulting pellets preferably are larger than granular size. Pellets of varying shades are then mixed by tumbling to produce a random dispersion of varying shades of pellets. The pellets are sieved to remove surface powder and are packed ready for use in the manufacture of dental plates. The pellets should be of such consistency that they can withstand packing and transportation but may nevertheless be crumbled by strong finger pressure.

In the formation of a dental plate, the pellets are preferably placed in a flexible impervious container 20 such as a polythene bag and then saturated with an appropriate quantity of methyl methacrylate monomer. The moistened pellets are then kneaded at intervals in the bag until the dough so formed reaches a state suitable for insertion into the dental flask for the formation of the denture plate. The dough has a mottled appearance due to the presence of the varying shaded pellets which, during the kneading of the dough, are merged into one another due to partial polymer solution. I have found that the flat generally conical shape of the pellets leads to more effective merging due to the ability of the pellets to overlap one another. When the denture is pressed in the flask, flow of the dough takes place in the general direction of the longitudinal axes of the teeth so that some degree of orientation of the various shadings occurs in that direction which is in fact the direction in which variation in natural gum tissue is most likely to occur.

Although the pellets will generally be used in random dispersion in the dough, some designed color effects may be obtained by, for example, the arrangement of a concentration of pellets of a particular color at a particular part of the dough as it is kneaded in the polythene bag, or, after kneading, strips or pieces of the dough of a certain color may be cut out and repositioned during loading of the flask to give a particular desired effect.

The action of heat and alcohol on the polymer powder during the formation of the pellets can reduce the working time of the dough formed from those pellets. If desired, this can be overcome by known methods, for example, by the use of powder having a larger grain size.

Denture base material in the form of the dry porous pellets above-described can be stored for an almost indefinite period and can readily be converted to a gel when required for use. Dentures formed from the material have a mottled appearance in relatively broad color areas which better simulates natural gum tissue than does conventional plain colored material and the cost of this is relatively less expensive than the use of preformed veneers.

I claim:

1. The method of preparing polymeric material for forming polychromatic denture bases for intra-oral restorative devices comprising the steps of wetting a mass of porous dry pellets of synthetic polymeric resin substantially larger than granular size and respectively tinted different shades of color corresponding to natural colors present in human gum tissues with a monomer of the same resin material, kneading said wetted pellets to a limited extent insufficient to blend the shades thereof into a monotone and thereby form a viscous dough in which the pellets of varying shades are merged into a homogeneous mass having a mottled polychromatic hue, and moulding said dough into a denture.

2. The method of forming polymeric denture base material to produce dry porous pellets thereof comprising the steps of wetting the surfaces of pre-pigmented powdered polymeric thermoplastic synthetic resin particles of denture base material with a solvent capable when heated of partially dissolving and thereby softening the powdered material to provide surface adherence of adjacent particles thereof, molding the material into pellet shapes, and applying heat to the wetted pellets to partially dissolve and soften the surfaces thereof to cause adherence of the particles to each other at points of contact thereon and then evaporate the solvent and reduce the pellets to dry porous condition in which the particles of polymeric material in the pellets are adhered together at the contact areas thereof.

3. The method according to claim 2, wherein the polymer is methyl methacrylate and the solvent is methyl alcohol.

4. The method according to claim 2, wherein the heat applied to the partially dissolved powdered material to dry the same is at temperatures in the range between 100° F. to 200° F.

5. The method according to claim 2, wherein the pellets are formed by moulding a slurry of said polymeric and monomeric material in a mould, subjecting said moulds with the material therein to an initial heating step within the range between 130° F. to 180° F., and then subjecting the same to a drying step within the range between 110° F. to 130° F., none of which temperatures are sufficient to melt said material.

6. The method according to claim 5, wherein the initial heating step is carried on for from one to six minutes and the subsequent drying step is carried on for from ten to fifteen minutes.

7. Polymeric material for forming polychromatic denture bases for intra-oral restorative devices comprising a mixture of porous dry pellets of synthetic polymeric resin substantially larger than granular size and respectively tinted different shades of color corresponding to natural colors present in human gum tissues, said pellets being highly porous throughout the same and thereby readily capable of absorbing compatible monomeric synthetic resin material in liquid form to soften said pellets for limited kneading to produce a dough-like mixture of moldable consistency.

8. The polymeric material according to claim 7 wherein said pellets are wafer-like in shape and have thinner edges than the centers to facilitate blending of contrasting colored pellets when formed into a dough.

9. The polymeric material according to claim 7 wherein said plurality of pellets of different hues comprise a mixture thereof in random dispersion relative to each other.

10. The polymeric material according to claim 7 wherein said pellets are of shallow conical form.

References Cited

UNITED STATES PATENTS

| 2,013,295 | 9/1935 | Tidd | 264—17 XR |
| 2,234,993 | 3/1941 | Vernon et al. | 264—16 XR |
| 2,367,767 | 1/1945 | Gale | 264—17 |
| 2,681,321 | 6/1954 | Stastny | 264—53 XR |
| 2,744,291 | 5/1956 | Stastny et al. | 264—53 |
| 2,972,170 | 2/1961 | Brickhead et al. | 264—51 XR |

FOREIGN PATENTS

| 1,381,751 | 1/1964 | France. |

PHILIP E. ANDERSON, *Primary Examiner.*

U.S. Cl. X.R.

106—35; 249—119; 260—2.5, 41; 264—77, 297